(12) United States Patent
Kautzer et al.

(10) Patent No.: US 7,929,795 B2
(45) Date of Patent: Apr. 19, 2011

(54) CODING SCHEME FOR A DATA STREAM REPRESENTING A TEMPORALLY VARYING GRAPHICS MODEL

(75) Inventors: Matthias Kautzer, Munich (DE); Karsten Mueller, Berlin (DE); Aljoscha Smolic, Berlin (DE); Thomas Wiegand, Berlin (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 1044 days.

(21) Appl. No.: 11/733,100

(22) Filed: Apr. 9, 2007

(65) Prior Publication Data

US 2007/0242894 A1    Oct. 18, 2007

Related U.S. Application Data

(63) Continuation of application No. PCT/EP2005/009937, filed on Sep. 15, 2005.

(30) Foreign Application Priority Data

Oct. 8, 2004    (DE) .................... 10 2004 049 156

(51) Int. Cl.
*G06K 9/46* (2006.01)
(52) U.S. Cl. ........ 382/243; 382/232; 382/233; 382/236; 382/250; 382/253; 375/240.12; 348/384.1
(58) Field of Classification Search .......... 382/232, 382/233, 243, 236, 250, 251, 252, 253, 245, 382/246; 345/555; 375/240.01, 240.02, 375/240.03, 240.12, 240.24, 240.08; 348/384.1, 440.1
See application file for complete search history.

(56) References Cited

U.S. PATENT DOCUMENTS

| | | | | |
|---|---|---|---|---|
| 4,802,102 | A * | 1/1989 | Lacey | 702/32 |
| 5,568,378 | A * | 10/1996 | Wojsznis | 700/44 |
| 6,775,326 | B2 | 8/2004 | Sekiguchi et al. | |
| 7,206,457 | B2 * | 4/2007 | Lee et al. | 382/243 |
| 7,538,798 | B2 | 5/2009 | Mizusawa | |
| 7,733,345 | B2 * | 6/2010 | Kim et al. | 345/473 |
| 2004/0021592 | A1 | 2/2004 | Karczewicz | |

FOREIGN PATENT DOCUMENTS

| | | |
|---|---|---|
| DE | 69813926 | 5/2003 |
| JP | 2002300043 | 10/2002 |
| JP | 2003204558 | 7/2003 |
| KR | 2003-0043621 | 6/2003 |

OTHER PUBLICATIONS

Zhang, J. et al. "Octree-based Animated Geometry Compression." Proceedings of the Data Compression Conference, 2004.

(Continued)

*Primary Examiner* — Samir A Ahmed
*Assistant Examiner* — Ali Bayat
(74) *Attorney, Agent, or Firm* — Michael A. Glenn; Glenn Patent Group

(57) ABSTRACT

Introducing a further prediction stage, namely a prediction of the motion vectors or the prediction error of the first prediction stage, does indeed at first increase the encoding or compression effort and, correspondingly, also the decoding or decompression effort, but the prediction proposed here leads to a significant improvement of the compression gain in relation to the effort in most graphics model sequences due to the uniformity of the motion.

9 Claims, 8 Drawing Sheets

OTHER PUBLICATIONS

Marpe, D. et al. "Context-Based Adaptive Binary Arithmetic Coding in the H.264/AVC Video Compression Standard." IEEE Transactions on Circuits and Systems for Video Technology, No. 13, No. 7, Jul. 2003.

Yang, J. et al. "Compression of 3-D Triangle Mesh Sequences Based on Vertex-Wise Motion Vector Prediction." IEEE Transactions on Circuits and Systems for Video Technology, No. 12, No. 12, Dec. 2002.

Ahn, J. et al. "Motion-compensated Compression of 3D Animation Models." Electronics Letters, vol. 37, No. 24 (Nov. 22, 2001).

Tekalp, A. et al. "Face and 2-D Mesh Animation in MPEG-4" Signal Processing Image Communication 15 (2000) 387-421.

Information Technology—Coding of Audio-Visual Objects. Annox O—3D Mesh Coding. ISO/IEC 2001. Part 2: Visual.

Lengyel J. et al. "Compression of Time-Dependent Geometry." Proceedings of the 1999 Symposium on Interactive 3D Graphics, (1999) pp. 89-95, 226.

Tao, B. et al. "Gradient-Based Residual Variance Modeling and its Applications to Motion-Compensated Video Coding." IEEE Transactions on Image Processing, vol. 10, No. 1 (Jan. 2001).

R.Rao K., et al, Techniques & Standards for image, video & audio coding, first edition, Kyoritsu Shuppa Co., Ltd., Jun. 10, 1999, first printing, pp. 23-31.

\* cited by examiner

| ABS. VALUE | BIN SERIES ||
|---|---|---|
| | TU PREFIX | EGO SUFFIX |
| 1 | 0 | |
| 2 | 1 0 | |
| 3 | 1 1 0 | |
| 4 | 1 1 1 0 | |
| 5 | 1 1 1 1 0 | |
| ... | | |
| 13 | 1 1 1 1 1 1 1 1 1 1 1 1 0 | |
| 14 | 1 1 1 1 1 1 1 1 1 1 1 1 1 0 | |
| 15 | 1 1 1 1 1 1 1 1 1 1 1 1 1 1 | 0 |
| 16 | 1 1 1 1 1 1 1 1 1 1 1 1 1 1 | 1 0 0 |
| 17 | 1 1 1 1 1 1 1 1 1 1 1 1 1 1 | 1 0 1 |
| 18 | 1 1 1 1 1 1 1 1 1 1 1 1 1 1 | 1 1 0 0 0 |
| 19 | 1 1 1 1 1 1 1 1 1 1 1 1 1 1 | 1 1 0 0 1 |
| 20 | 1 1 1 1 1 1 1 1 1 1 1 1 1 1 | 1 1 0 1 0 |
| BIN | 1 2 3 4 5 6 7 8 9 10 11 12 13 14 | 15 16 17 18 19 ... |

FIGURE 6

CODING SCHEME FOR A DATA STREAM REPRESENTING A TEMPORALLY VARYING GRAPHICS MODEL

CROSS-REFERENCE TO RELATED APPLICATIONS

This application is a continuation of copending International Application No. PCT/EP2005/009937, filed Sep. 15, 2005, which designated the United States and was not published in English.

TECHNICAL FIELD

The present invention relates to encoding/decoding a data stream representing a temporally varying graphics model, and particularly to the compression of such graphics model data.

BACKGROUND

Temporally varying 3D computer graphics models find broad application in the classic computer graphics today. 3D computer graphics models, for example, find application in games, virtual worlds, cartoon productions, etc., but also in more recent systems, which are referred to as Free Viewpoint Video (FVV) or 3D Video Objects (3DVO).

3D computer graphics models describe the surface of 3D objects in a virtual 3D coordinate system. To this end, the 3D coordinates (x, y, z) of a certain number of control points or vertices lying on the surface or arranged along the same are defined. The continuous surface is defined by different approaches of the parameterization. In a parameterization referred to as polygon mesh, the shape of the surface of 3D objects, for example, is defined by polygons, the corner points of which form the control points. For the complete description of an object, the indication of connectivity, i.e. the indication as to which control points are each summarized to polygons, also belongs here. The complete 3D object then develops by association of color, texture and further features, such as reflection, etc. Depending on surface parameterization used, these features are associated with the connectivity or directly with the point representation.

The usual representation of a 3D geometry thus is the indication of 3D coordinates of control points in a list with or without indication of their connectivity. In the case of the above-mentioned polygon connectivity for a triangle mesh, for example, three control points each at the corresponding list numbers form a triangle, which are again summarized in a list. The 3D coordinates may be present as floating-point or integer values. The connectivity consists of integer values, namely the indication of list numbers at which the corresponding control points are arranged in the list.

For exchanging and transmitting the 3D geometry between various systems and applications, it is desirable to use a specified text format, such as Virtual Reality Modelling Language (VRML), because this enables parsing the 3D data on the reception side.

Moreover, above all, it is also desirable to reduce the necessary amount of data for coding a 3D geometry, in order to reduce transmission data rate and necessary memory space. Such a reduction can be attained if special compression methods are employed. For this reason, in the MPEG-4 standard, a method for coding the 3D geometry of static objects was standardized, which is referred to as 3D Mesh Coding (3DMC). 3DMC is a binary format, which also makes functionalities for the transmission improved as opposed to the text format available, apart from 30 to 40-fold compression.

In a plurality of applications, however, dynamic, i.e. temporally varying, 3D models occur. In the classic computer graphics, these develop by animation, with an operator often newly establishing the model for each time instant. In more recent methods of FVV or 3DVO, dynamic models develop by the reconstruction of the 3D movement of real objects, which are recorded by several cameras. Basically, it can be discriminated between two cases of dynamic 3D models. In the first case, the topology remains the same, i.e. the number of control points or vertices and the connectivity are constant over time. Only the 3D position of the control points changes. The second case represents a generalization. In this case, changes in the topology are also admissible.

In some cases, the temporal change can be described by animation, i.e. by describing the changes by means of an underlying physical movement model. Examples for this are the animation of human faces and bodies, which are already standardized, also in MPEG-4, namely by the so-called FBA (Face and Body Animation) method. Such animation models are disadvantageous in that they are not transferable to a general case, i.e. that they are restricted to special movement sequences and/or special objects, such as faces, etc. If no animation model exists, for each time instant, rather a new 3D model or a new mesh of control points has to be transferred, which is then coded for each time instant with MPEG-4 3DMC, but since it is the same object in motion at every time instant, this data still contains a lot of temporal redundancy, which could be used for further compression.

In J. Zhang and C. B. Owen, "*Octree-based Animated Geometry Compression*", DCC'04, Data Compression Conference, Snowbird, Utah, USA, pages 508-517, Mar. 23-25, 2004, a method of coding temporally varying 3D models is described in which the temporal change is described by prediction of the control points, quantization of the prediction error or the motion vectors and summarizing motion vectors to groups. The compression, i.e. the reduction in the bit rate, is done following the general principle of Differential Pulse Code Modulation (DPCM). In this manner, even more significant compression gains, i.e. bit-rate savings at equal quality or better quality at equal bit-rate, can be attained for dynamic models as opposed to 3DMC.

With the increasing employment of 3D models in the most diverse field of application, however, the need for more effective coding schemes for better compression of dynamic models increases.

SUMMARY

According to an embodiment, an apparatus for encoding a data stream representing a temporally varying graphics model, the data stream having a series of data portions with coordinate data defining the graphics model at different time instants, may have: a first predictor for predicting coordinate data of a first data portion currently to be encoded, based on coordinate data of a second data portion preceding the first data portion currently to be encoded, in order to obtain predicted coordinate data for the first data portion; a first comparator for comparing the predicted coordinate data for the first data portion and the coordinate data for the first data portion, in order to obtain prediction error vectors for the first data portion currently to be encoded; a second predictor for predicting the prediction error vectors for the first data portion based on prediction error vectors already obtained, in order to obtain predicted prediction error vectors for the first data portion; a second comparator for comparing the predicted prediction error vectors for the first data portion and the prediction error vectors for the first data portion, in order to obtain prediction error vector differences for the first data portion; and a processor for processing the prediction error vector differences for the first data portion, in order to obtain part of an encoded data stream.

According to another embodiment, an apparatus for decoding an encoded data stream, which is an encoded form of a data stream representing a temporally varying graphics model, the data stream having a series of data portions with coordinate data defining the graphics model at different time instants, and the encoded data stream including prediction error vector differences, may have: a processor for processing the encoded data stream in order to obtain decoded prediction error vector differences; a first predictor for predicting prediction error vectors for a first data portion currently to be decoded, based on already-decoded prediction error vector differences, in order to obtain predicted prediction error vectors for the first data portion; a first combiner for combining the predicted prediction error vectors with prediction error vector differences of the first data portion currently to be decoded, in order to obtain prediction error vectors for the first data portion; a second predictor for predicting coordinate data of the first data portion based on already-obtained coordinate data of a second data portion preceding the first data portion, in order to obtain predicted coordinate data for the first data portion; and a second combiner for combining the predicted coordinate data for the first data portion with the prediction error vectors for the first data portion, in order to obtain the coordinate data of the first data portion.

According to another embodiment, a method for encoding a data stream representing a temporally varying graphics model, the data stream having a series of data portions with coordinate data defining the graphics model at different time instants, may have the steps of: predicting coordinate data of a first data portion currently to be encoded, based on coordinate data of a second data portion preceding the first data portion currently to be encoded, in order to obtain predicted coordinate data for the first data portion; comparing the predicted coordinate data for the first data portion and the coordinate data for the first data portion, in order to obtain prediction error vectors for the first data portion currently to be encoded; predicting the prediction error vectors for the first data portion based on prediction error vectors already obtained, in order to obtain predicted prediction error vectors for the first data portion; comparing the predicted prediction error vectors for the first data portion and the prediction error vectors for the first data portion, in order to obtain prediction error vector differences for the first data portion; and processing the prediction error vector differences for the first data portion, in order to obtain part of an encoded data stream.

According to another embodiment, a method for decoding an encoded data stream, which is an encoded form of a data stream representing a temporally varying graphics model, the data stream having a series of data portions with coordinate data defining the graphics model at different time instants, and the encoded data stream including prediction error vector differences, may have the steps of: processing the encoded data stream in order to obtain decoded prediction error vector differences; predicting prediction error vectors for a first data portion currently to be decoded, based on already-decoded prediction error vector differences, in order to obtain predicted prediction error vectors for the first data portion; combining the predicted prediction error vectors with prediction error vector differences of the first data portion currently to be decoded, in order to obtain prediction error vectors for the first data portion; predicting coordinate data of the first data portion based on already-obtained coordinate data of a second data portion preceding the first data portion, in order to obtain predicted coordinate data for the first data portion; and combining the predicted coordinate data for the first data portion with the prediction error vectors for the first data portion, in order to obtain the coordinate data of the first data portion.

According to another embodiment, a computer program may have a program code for performing, when the computer program is executed on a computer, a method for encoding a data stream representing a temporally varying graphics model, the data stream having a series of data portions with coordinate data defining the graphics model at different time instants, wherein the method may have the steps of: predicting coordinate data of a first data portion currently to be encoded, based on coordinate data of a second data portion preceding the first data portion currently to be encoded, in order to obtain predicted coordinate data for the first data portion; comparing the predicted coordinate data for the first data portion and the coordinate data for the first data portion, in order to obtain prediction error vectors for the first data portion currently to be encoded; predicting the prediction error vectors for the first data portion based on prediction error vectors already obtained, in order to obtain predicted prediction error vectors for the first data portion; comparing the predicted prediction error vectors for the first data portion and the prediction error vectors for the first data portion, in order to obtain prediction error vector differences for the first data portion; and processing the prediction error vector differences for the first data portion, in order to obtain part of an encoded data stream.

According to another embodiment, a computer program may have a program code for performing, when the computer program is executed on a computer, a method for decoding an encoded data stream, which is an encoded form of a data stream representing a temporally varying graphics model, the data stream having a series of data portions with coordinate data defining the graphics model at different time instants, and the encoded data stream including prediction error vector differences, wherein the method may have the steps of: processing the encoded data stream in order to obtain decoded prediction error vector differences; predicting prediction error vectors for a first data portion currently to be decoded, based on already-decoded prediction error vector differences, in order to obtain predicted prediction error vectors for the first data portion; combining the predicted prediction error vectors with prediction error vector differences of the first data portion currently to be decoded, in order to obtain prediction error vectors for the first data portion; predicting coordinate data of the first data portion based on already-obtained coordinate data of a second data portion preceding the first data portion, in order to obtain predicted coordinate data for the first data portion; and combining the predicted coordinate data for the first data portion with the prediction error vectors for the first data portion, in order to obtain the coordinate data of the first data portion.

According to the invention, encoding a data stream, which represents a temporally varying graphics model and has a series of data portions, which comprise coordinate data defining the graphics model at different time instants, includes a prediction of the coordinate data of a first data portion currently to be encoded based on coordinate data of a second data portion preceding the first data portion currently to be encoded, in order to obtain predicted coordinate data for the first data portion, as well as a comparison of the predicted coordinate data for the first data portion and the coordinate data of the first data portion, in order to obtain prediction error vectors for the first data portion currently to be encoded. A second prediction then takes place, namely a prediction of the prediction error vectors for the first data portion based on the prediction error vectors already obtained, in order to obtain prediction error vectors for the first data portion, whereupon the predicted prediction error vectors for the first data portion and the prediction error vectors for the first data portion are compared to each other, in order to obtain prediction error vector differences for the first data portion. These prediction error vector differences are then processed to obtain a part of an encoded data stream.

Correspondingly, decoding takes place in reverse manner. An encoded data steam, which represents an encoded form of the above data stream and contains the encoded prediction error vector differences, is decoded by at first processing the encoded data stream, in order to obtain decoded prediction error vector differences. Prediction error vectors for the first data portion currently to be decoded are predicted based on prediction error vector differences already decoded, in order to obtain predicted prediction error vectors for the first data portion. These predicted prediction error vectors are combined with prediction error vector differences of the first data portion currently to be decoded, in order to obtain prediction error vectors for the first data portion. A second prediction then takes place, namely the prediction of coordinate data of the first data portion based on coordinate data of a second data portion preceding the first data portion, in order to obtain predicted coordinate data for the first data portion, whereupon the predicted coordinate data for the first data portion is combined with the prediction error vectors for the first data portion, in order to obtain the coordinate data of the first data portion currently to be decoded.

It is the finding of the present invention that introducing a further prediction stage, namely prediction of the motion vectors or the prediction error of the first prediction stage, indeed at first increases the encoding and/or compression effort, and, correspondingly, also the decoding and/or decompression effort, but that this prediction leads to significant improvement of the compression gain in relation to the effort in most graphics model sequences due to the uniformity of the movement.

The prediction of the prediction error vectors, i.e. the second prediction stage, may include a temporal prediction and/or a spatial prediction. More specifically, for the prediction of prediction error vectors of a data portion currently to be encoded, both the prediction error vectors for a data portion preceding the data portion currently to be encoded, and the prediction error vectors for the data portion currently to be encoded may be used, the latter, of course, only when they are already present.

According to a particular embodiment, for temporal prediction of a prediction error vector based on the prediction error vector of a preceding data portion, that prediction error vector of this data portion representing the motion vector for the same coordinate information and/or for the same control point is used.

In the case of the spatial prediction of a prediction error vector based on an already-obtained prediction error vector of the same data portion, for the prediction that prediction error vector adjacent to the one to be predicted is used, which is determined either on the basis of connectivity and/or neighborhood information in the data stream or by geometrical analysis.

If there are several temporal/spatial predictors or predicted prediction error vectors available for a prediction error vector to be predicted, for example, the predicted prediction error vector is determined based on the median of all these predictors.

According to a particular embodiment of the present invention, the prediction error vector differences are still subjected to clustering and ensuing scaling/quantization, in order to reduce the bit-rate.

According to a particular embodiment of the present invention, the prediction error vector differences are finally binarily arithmetically coded. To this end, they are advantageously at first binarized, i.e. brought into a form of a series of binary decisions or bins or into a bit series. The bit series is then binarily arithmetically coded in bin or bit-wise manner. The binary arithmetic coding may work based on adaptive probability estimations and/or a static-probability estimation. It is also possible to employ context models, i.e. perform the adaptation of the probability estimation for the different bits or bins of the binarizations in an isolated manner from each other.

In order to limit the effort of the binary arithmetic coding and still maintain the compression rate as high as possible, according to a particular embodiment of the present invention, the binarization is performed on the basis of two different binarization schemes, wherein the first binarization scheme exclusively finds application if the datum to be binarized is smaller than a predetermined threshold value, and, if the datum is greater than the threshold value, the first binarization scheme is applied to the threshold value, in order to obtain a prefix, and the second binarization scheme is used for the rest of the datum to be binarized. In other words, the binarization in the case mentioned first only consists of the prefix, and in the case mentioned secondly of both the prefix and of the suffix. According to the particular embodiments, the bits of the prefix are then binarily adaptively encoded with an adaptive probability model, if necessary under context modeling, i.e. with different adaptive probability estimations for the individual bits, whereas the bits of the suffix are binarily arithmetically encoded with a static probability estimation. This considerably reduces the computation effort for the arithmetic encoding and provides for only small compression rate loss with suitable choice of the binarization schemes for the prediction error vector differences.

BRIEF DESCRIPTION OF THE DRAWINGS

Preferred embodiments of the present invention will be detailed subsequently referring to the appended drawings, in which:

FIG. 6 is a table for the exemplary illustration of the binarization result according to FIG. 5;

DETAILED DESCRIPTION

Figure 1:
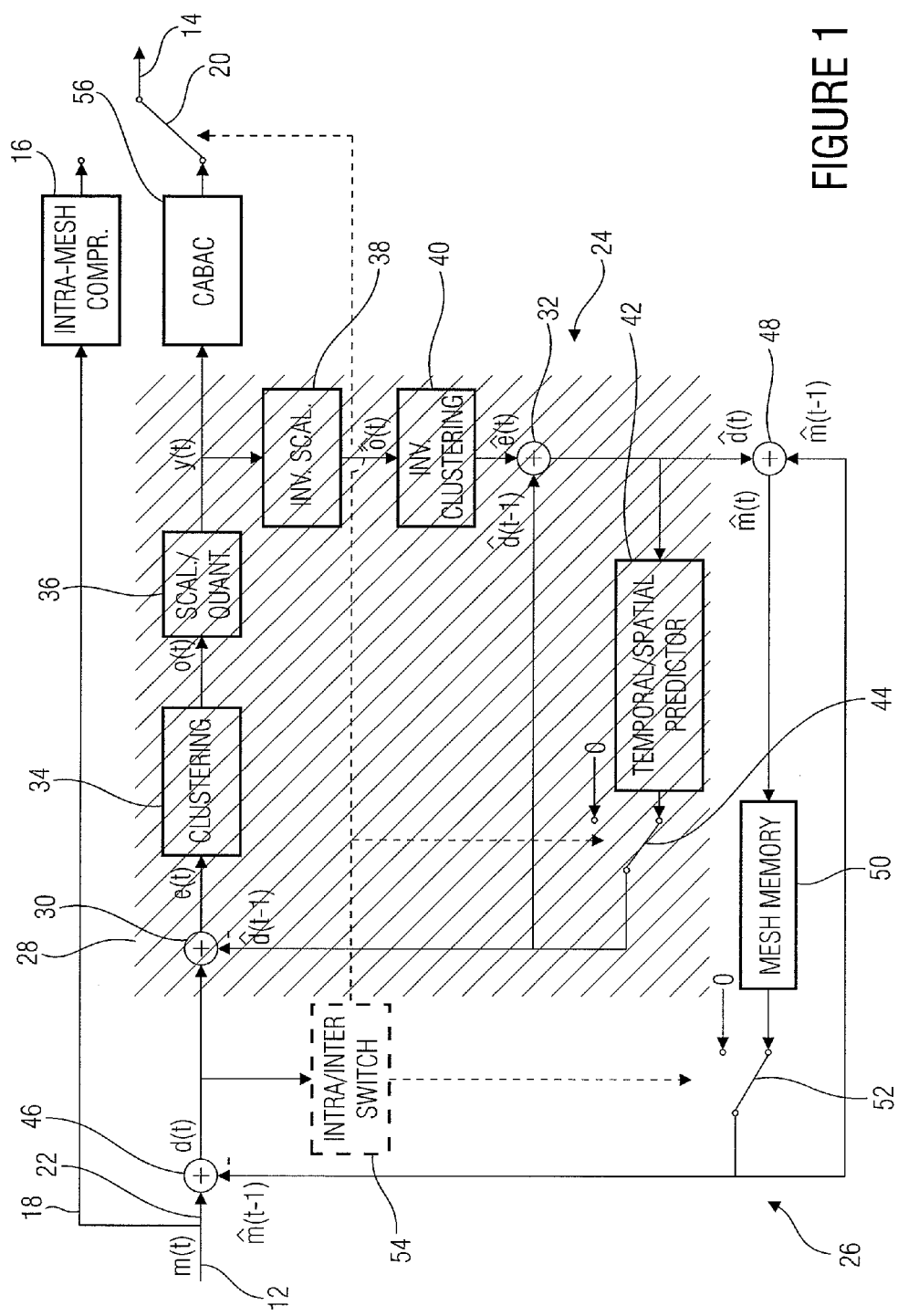
FIG. 1 is a block circuit diagram of an encoder according to an embodiment of the present invention.

FIG. 1 shows an encoder for encoding a data stream representing a temporally varying graphics model, according to an embodiment of the present invention. The encoder, which is generally indicated at 10, includes an input 12 for receiving the data stream to be encoded and an output 14 for outputting the encoded data stream. Internally, the encoder 10 includes an intra-encoding means 16, which is connected into an intra-encoding path 18 extending between the input 12 and a first input of a switch 20. In an inter-encoding path 22 passing in parallel to the intra path 18, the remaining part 24 of the encoder 10 is connected, which represents the inter-encoding part, i.e. that part of the encoder 10 that performs the encoding of the location of the graphics model relative to a time instant independence on preceding parts of the data stream referring to preceding time instants, as it will still become clearer in the following, as opposed to the intra-encoding means 16, which does the encoding of the location of the graphics model at a time instant independently of that part of the data stream referring to other time instants.

The inter-encoding part 24 consists of two interleaved DPCM loops, namely an outer loop 26, which is used for the prediction of vertices or control points in the data stream at the input 12, and an inner loop 28, which is responsible for the prediction of the shift vectors and/or the prediction errors of the outer loop 26.

The inner loop 28 includes a comparator, namely a difference formation means or a differentiator 30, a combiner, namely an addition means or an adder 32, a cluster formation means 34, a scaling/quantization means 36, an inverse scaling means 38 as a counterpart to the scaling/quantization means 36, an inverse cluster formation means or cluster resolution means 40 as a counterpart to the cluster formation means 34, a prediction means 42 for temporal or spatial prediction, and a switch 44.

The outer loop 26 overlaps with the inner loop 28 with reference to the components 30-40, and, in addition hereto, includes a comparator or comparison means, namely a differentiator 46, and a combiner or combination means, namely an adder 48, as well as a memory or mesh memory 50, and a switch 52.

The inter-encoding part 24 further includes a control means 54 referred to as intra/inter switch, as well as an encoding means 56 for arithmetic coding.

With reference to the internal connection of the components, the differentiator 46, the differentiator 30, the cluster formation means 34, the scaling/quantization means 36, and the encoding means 56 are connected in series into the inter-encoding path 22 between input 12 and switch 20. The switch 20 is controllable by the control means 54, in order to controllably connect either the intra path 18 or the inter path 22 to the output 14.

Between the output of the scaling/quantization means 36 and the input of the encoding means 56, the loops 26 and 28 branch off in form of a series connection of inverse scaling means 38, inverse cluster formation means 40 and adder 32. In particular, a first input of the adder 32 is connected to an output of the inverse cluster formation means 40, whereas an output of the adder 32 is connected to an input of the prediction means 42 of the inner loop 28. The switch 44 includes two inputs, namely one connected to an output of the prediction means 42, and another at which logic zeros are present as prediction replacement for the shift vectors. The switch 44 is controlled by the control means 54 and enables the same to apply either the output of the prediction means 42 or the logic zeros to an inverting input of the differentiator 30. With the non-inverting input, the differentiator 30 is connected to an output of the differentiator 46. The output of the switch 44 is not only connected to the inverting input of the differentiator 30, but also to a further input of the adder 32.

The output of the adder 32 is further connected to an input of the adder 48, the output of which is, in turn, connected to an input of the memory 50. The switch 52 includes two inputs, of which one is connected to the output of the memory 50 and the other one to a terminal at which logic zeros are present as a replacement for predicted control points. The switch 52 is controlled by the control means 54 and enables the same to either apply the logic zeros or the content of the memory 50 to an inverting input of the differentiator 46 and a further input of the adder 48. A non-inverting input of the differentiator 46 is connected to the input 12 via the inter path 22.

After having previously described the construction of the encoder 10, its functioning will be described in the following.

The data stream incoming at the input 12 represents a temporally varying graphics model. In other words, the incoming data stream consists of a series of data portions, which have the control points or coordinate data defining the graphics model at different time instants. It depends on the underlying parameterization how the surface of a model finally defines itself from the control points. Depending on parameterization, connectivity information, which determines neighborhood relations among the same and is required for a complete determination or parameterization of the model, may further be associated with the control points.

There are, indeed, different approaches of parameterization. In the following, it is exemplarily to be assumed, however, that the parameterization is a polygon mesh parameterization. According to the polygon mesh parameterization, the shape of the surface of the graphics model or the 3D object is defined by polygons, the corner points of which form the control points. The simplest shapes of the surface polygons are planar triangular areas. For the complete description of an object, the indication of the connectivity is required, i.e. which control points each are summarized to polygons, wherein this connectivity information, as already mentioned, is contained in the incoming data stream. Control points and connectivity together describe the geometry of the objects.

The control points defining the surface of the graphics model at a certain time instant are obtained in a data portion. The connectivity information could be re-transmitted for each data portion and/or for each time instant, but is preferably only present in the data stream 12 in those data portions at which the topology and/or the connectivity information in the data stream changes.

A special case of the polygon mesh parameterization is so-called regular rectangular grids, so-called elevation grids, which are defined with reference to a plane lying in space arbitrarily. Here, two of the three coordinates (x, y, z) of the control points indicate the spatial position of the control points in the grid, while the remaining third coordinate indicates the perpendicular deviation of the point from the plane or the depth of the point with reference to the plane.

Figure 2:
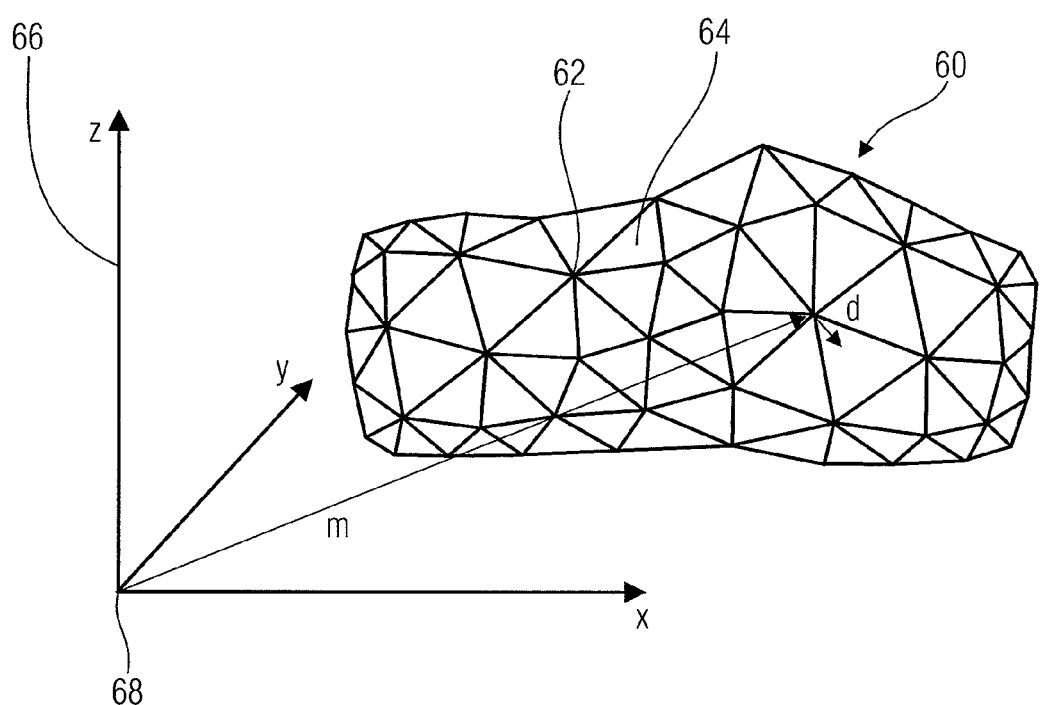
FIG. 2 is a simplified view of a polygon mesh.

In order to be able to more clearly illustrate the following discussion of the functioning of the encoder 10 of FIG. 1, in the following—as already mentioned—it will be assumed that the polygon mesh parameterization underlies the data stream at the input 12. FIG. 2 exemplarily shows a graphics model 6o in polygon mesh parameterization at an arbitrary time instant in spatial illustration. The data portion of the incoming data stream defining this time instant, as well as the position of the changing graphics model defined by this data portion, will sometimes also be referred to as mesh or grid in the following by analogy with the grid resulting when the control points are connected to each other with connection lines according to the connectivity information, as can be seen in FIG. 2. A mesh includes the control points 62 on the surface of the object 60. In addition, the data stream 12, either in the data portion itself or in a preceding data portion, contains connectivity information indicating which three of the control points 62 belong to a polygon 64, here a triangle. The control point 62 can be seen at the intersections of the lines of the graphics model 60 in FIG. 2, whereas the polygons or triangles are circumscribed by these lines.

In the following description, the control points will be designated with $m_i(t)$, with the index i to be the list number uniquely associated with the respective control point 62, and t to indicate the time instant at which this control point is at the position $m_i(t)$. In other words, $m_i(t)$ is a vector defining the location of the control point i with reference to a coordinate system 66 with a predetermined origin 68. The entirety of all control points i defining the graphics model at a time instant t will also sometimes be referred to as m(t) in the following. With m(t−1), the entirety of the control points defining the graphics model at a time instant t−1 is designated, i.e. at a time instant immediately before the time instant t, with m(t−2) the entirety of the control points defining the graphics model at a time instant t−2, etc. The 3D model m(t) at the time instant t is the one currently to be compressed.

When the data stream now arrives at the input 12, at first the first data portion arrives, which defines the graphics model at the first time instant t=0. In this situation, the encoder 10 is missing prior information on the graphics model. In other words, this model has then not yet been pre-processed, and the mesh memory 50 is still empty. In this situation, the inter-encoding path 24 cannot perform prediction. For this reason, in this case, the control 54 at first adjusts the switch 20, such that a static coding, which is generated by the intra-encoding means 16 of the data portion at the time instant t=0 and/or the control point m(t) and maybe the associated connectivity information, are coupled into the encoded data stream 14. The static coding, for example, is a 3DMC from MPEG-4. A static coding of a data portion is supposed to mean that the coding of this time portion and/or the control point m(t=0) in this data portion is encoded in an isolated manner, i.e. without dependency on other data in the data stream, so that the decoding result of this data portion may also be obtained independently from the knowledge of the content of the other data portions.

At this time instant, since the control 54 controls the switch 20 so as to gate the intra path 18 to the output 14, the control means 54 controls the switches 44 and 52 so as to apply the prediction replacement, namely the logic zero, each to the inverted inputs of the differentiators 46 and 30. While the intra-encoding means 16 thus performs the static coding of the control point m(t=0), the control points m(t=0) reach the input of the cluster formation means 34 in unchanged manner, where they are subjected to a group formation to be discussed in greater detail in the following in order to reduce the number of vectors. The vectors, decimated in number, if necessary, are then scaled and quantized in the scaling/quantization means 36—of course with loss of information—, again scaled back in the inverse scaling means 38, and then split up again into control points $\hat{m}(t)$ in the group resolution means 40, from where they reach the input of the mesh memory 50 in order to serve as predicted control points or a prediction of the control points at the next time instant.

This switch position, namely switches 20, 44 and 52 in the upper switch position in FIG. 1, is done by the controller 54 not only for the first mesh to be encoded, i.e. at the time instant t=0, but also if a change of the scene or object content occurs, which the controller 54 derives from side information in the data stream 12, for example, a topology change of the model occurs, which the controller 54 further determines on the basis of side information in the data stream 12, such as on the basis of newly-transmitted connectivity information, for example, whereby the encoder 10 and/or the corresponding encoding method is generally applicable for all kinds of models, or the reconstruction error of the outer loop 26 becomes too large, i.e. the difference between the original and the decoded model and/or the difference between the control points m(t) currently to be encoded and the control points $\hat{m}(t-1)$ present in the memory 50 becomes too large.

For determining the reconstruction errors, the controller 54 is also connected to the output of the differentiator 46.

The switch position in which the switches 20, 44 and 52 are present in the upper switch position therefore is referred to as intra mode of the encoder 10, because no prediction is done.

In contrast, the functioning of the encoder 10 during the inter mode will be described in the following. In this mode, the switches 20 and 52 are controlled by the controller 54 such that the switches 20 and 52 are in the lower switch position, i.e. the inter path 22 is connected to the output 14, and the output of the memory 50 is connected to the inverting input of the differentiator 46. The adjustment of the switch 44 is done motion-vector-wise, as it will be described in the following, so that, alternatively, either the output of the prediction means 42 or the prediction replacement zero is connected to the inverting input of the differentiator 30.

In the inter mode, further compression is achieved by, at first, reducing temporal redundancy by prediction by the outer loop 26, and then reducing temporal and/or spatial redundancy by temporal and/or spatial prediction of the inner loop 28, as it will be described in greater detail in the following.

As could be taken from the previous description of the intra mode, following the execution of such an intra mode for a data portion referring to the time instant t, there is a copy of the mesh at this time instant t in the memory 50, including the control points $\hat{m}(t)$, which deviate from the original version of the control point m(t) only by the quantization in the quantization means 36. If the next data portion at the time instant t+1 is a mesh with the same topology, i.e. comprises control points m(t+1), which are referred to the same connectivity information as the control point m(t), prediction in the outer loop 26 is possible.

The case that control points m(t) for a mesh with a topology equal to a topology of the previous mesh at the time instant t−1 arrive at the input 12 is now to be considered. The corresponding reconstructed mesh for the time instant t−1 is then in the form of control points $\hat{m}(t-1)$ in the memory 50 and is applied to the inverting input of the differentiator 46 via the switch 52, which is adjusted to the lower switch position by the controller 54. The differentiator 46 then forms the difference between the control points m(t) and the reconstructed control points $\hat{m}(t-1)$, whereby shift vectors d(t) result at the output of the differentiator 46, representing the prediction error of the outer prediction loop 26. From the output of the differentiator 46 to the input of the differentiator 30, thus, not vertices themselves are transmitted, but shift vectors d(t). These shift vectors d(t) more specifically describe the difference of the individual coordinates in x, y, z (see FIG. 2) of each individual control point i between the mesh currently to be transmitted at the time instant t and the previously-reconstructed mesh at the time instant t−1, i.e. $d_i(t)=m_i(t)-\hat{m}_i(t-1)$ for all i between 1 and N, with N to indicate the number of control points in the meshes at the time instant t and t−1, which have the same topology and, thus, also the same number of vertices, while the inter mode is present.

By the inner prediction loop 28, the shift vectors d(t) are now predicted from previously transmitted shift vectors and/or shift vectors deduced from previously transmitted control points. This second prediction is not possible for all shift vectors $d_i(t)$. For a particular shift vector $d_i(t)$, a temporal prediction is possible if more than one mesh with the same topology as the current mesh has already been transmitted. Then, for each vertex i, already at least coordinate information $m_i(t-2)$ and $m_i(t-1)$ has been received at the input 12, from which, as it will still be described, a predicted shift vector $\hat{d}(t-1)$ could be deduced and applied to the inverting input of the differentiator 30, which then hence serves for prediction. Such a temporal prediction promises gains above all because the movement of objects over time generally does not change abruptly, and hence prediction of the movement from known movement is possible, and/or the motion vector differences arising are small and hence compressible with lower rate. The temporal prediction will be described in even greater detail in the following, and performed by the prediction means 42.

A spatial prediction may also be performed by the means 42, namely if already at least one control point $m_i(t)$ of the mesh t just processed has been transmitted. For this control point i, the information $m_i(t-1)$ has already arrived then, and the shift vector $\hat{d}_i(t)$ is available in the prediction means 42, as it will still be described in the following. The assumption that all spatial neighbors j at this control point i are associated with shift vectors $d_j(t)$ having about the same value as $d_i(t)$ is justified, because the movement does not change abruptly across an object. For this reason, the values $\hat{d}_j(t)$ of the neighborhood vertex j can be used as spatial predictors for $d_i(t)$, and conversely $\hat{d}_i(t)$ as spatial predictor for the values $d_j(t)$. Spatial neighbors j to a current vertex i and/or an associated motion vector $d_i(t)$ may here be determined by the prediction means 42, for example, by being spatially connected to the vertex i currently to be encoded, i.e. for example, forming a polygon in a polygon mesh depending on the kind of surface parameterization, being adjacent control points of an approximating polygon function, or being spatial neighbors of vertex i in any form along the surface or geometry of the graphics model. For example, this information is acquired from the topology description of the 3D model or by geometrical checks. Even the shift vectors $d_j(t)$ of all spatial neighbors j of the current mesh already transmitted may be used for prediction.

Finally, the predictor $\hat{d}_i(t-1)$ for the shift vector $d_i(t)$ of the current vertex i is determined from the entirety of the available spatial and temporal prediction vectors. To this end, a median filter is employed, i.e. the means 42 selects, among the available prediction vectors in an arrangement, because the same are sorted according to their length, the middle one in case of an odd number of prediction vectors, and, for example, the mean value of the two middle prediction vectors in the case of an even number of predictors, as the final prediction vector. For example, if a set of four spatially-predicted shift vectors $\hat{d}_j(t)$ is present next to a temporally-predicted shift vector $\hat{d}_i(t-1)$, with $j \in \{\text{neighbor of i}\}$, the prediction means 42 selects the third one from this set of five prediction vectors, if these are arranged according to length.

Instead of using median filtering, the use of averaging or the like would also be possible.

Finally, the differentiator 30 forms the differences between the predictors $\hat{d}(t-1)$ and/or predicted shift vectors and the shift vectors d(t), as transmitted by the differentiator 46, namely the shift vectors of the current mesh. The result is shift vector differences e(t), with one shift vector difference $e_i(t)$ being formed per vertex i. It is to be pointed out that a shift vector difference $e_i(t)$ corresponds to the motion vector $d_i(t)$ in the absence of a predictor.

The previously-described prediction by the inner loop 28, namely the predicting of the shift vectors, together with the further processing of the shift vector differences e(t), represents a decisive difference and advantage with respect to the method described in the introductory section of the description in which rather only the vertices themselves are predicted and the arising shift vectors are processed further.

The functioning of the prediction of the inner loop 28 was previously described rather in general for all shift vectors d(t) going into the loop 28. With more detailed consideration of the individual shift vectors $d_i(t)$ to the individual vertices i, it is to be pointed out, however, that a predictor does not have to be present for each shift vector $d_i(t)$. After all, as it has become obvious from the previous description, for all shift vectors d(t) at a time instant t, which immediately precedes an intra mode at the time instant t−1, necessary information to form a predicted shift vector $\hat{d}(t-1)$ is missing, for which also control point information for the vertex at the time instant t−2 would have to be present after all. Additionally or alternatively, it may be that a spatial predictor is missing, because the shift vector $d_i(t)$ to be predicted is referred to a vertex i for the neighbors j of which no shift vectors $d_j(t)$ and/or control points $m_j(t)$ have been obtained or can be derived yet from the data stream at the input 12. In this case, since neither the temporal nor the spatial predictor for a shift vector $d_i(t)$ can be provided by the prediction means 42, the control means 54 therefore sets the switch 44 to the upper switch position. Otherwise, the switch is set to the lower switch position in FIG. 1. In other words, the control means 54 controls the switch 44 for each shift vector d(t) individually, depending on the presence of a predictor, during the intra mode.

Furthermore, in the previous description, the part of the loops 28 and 26 between the output of the differentiator 30 and the input of the adder 32 has been ignored. The meaning of this part will be described in the following, wherein it is pointed to the fact that it is assumed, in this more accurate description of that part, that the prediction means 42 only performs a temporal prediction, i.e. a prediction of the incoming shift vectors $d_i(t)$ based on the preceding shift vectors $d_i(t-1)$ and/or the control points at the two preceding time instants, i.e. $m_i(t-1)$ and $m_i(t-2)$.

The cluster formation means 34 receives the shift vector differences e(t) for the mesh currently to be encoded at the time instant t. The cluster formation means 34, the functioning of which will be discussed in greater detail in the following with reference to FIG. 3, performs a summary of similar and adjacent shift vector differences, such as following an Octree algorithm. In other words, the cluster formation means 34 replaces the shift vector differences e(t) with a set of substitution shift vector differences o(t), the number of substitution shift vector differences of which is smaller than the number of shift vector differences e(t). As a result, the number of values to be transmitted is reduced, namely the coordinates of the individual vector differences. The replacement shift vector differences o(t) are then scaled and quantized in the scaling/quantization means 36, whereby quantized vectors y(t) result. These are, in turn, supplied to the encoding means 56, which arithmetically encodes the same, as will be described in still greater detail in the following. The values y(t) encoded and compressed in such a manner are coupled into the encoded data stream at the output 14.

For closing the two DPCM loops 26 and 28, the output signal m(t) at the decoder 10 is reconstructed again on the basis of the quantized vectors y(t), wherein all previous steps of the encoder, namely the different formation in the differentiators 46 and 30, the cluster formation in the means 34, and the scaling in the scaling/quantization means 36 are cancelled or performed in an inversed manner. Correspondingly, the inverse scaling means 38 scales the vectors y(t) with a scaling factor inverse to a scaling factor used by the scaling means 36, whereby a reconstructed set of substitution shift vector differences ô(t) results. This set of reconstructed substitution shift vector differences is converted into a set of reconstructed or decoded shift vector differences ê(t) in the cluster resolution means 40, by canceling the cluster classification by the means 34. If necessary, to this end, the cluster resolution means 40 uses side information, which the cluster formation means 34 outputs together with the substitution shift vector differences o(t), and which is also encoded into the encoded bit stream at the output 14 as side information, if necessary, as it will still be explained with reference to FIG. 3.

So as to now reconstruct the shift vector d(t), a certain reconstructed shift vector difference $\hat{e}_i(t)$ is present at an input in the adder 32, and at the same time the same predictor $\hat{d}(t-1)$ at the other input, which is present at the inverting input of the differentiator 30 at the time instant when it generates the shift vector difference $e_i(t)$ from the shift vector $d_i(t)$. The result at the output of the adder therefore is the reconstructed shift vector $\hat{d}_i(t)$. It reaches the prediction means 42, which may then use it for the prediction of the shift vector d(t+1) for the subsequent data portion in the data stream at the input 12, in particular for the shift vector $d_i(t+1)$, as well as the output of the adder 48. The adder 48 cancels the difference formation at the differentiator 46 by adding, to the reconstructed shift vectors $\hat{d}(t)$, those predicted control points $\hat{m}(t-1)$ that are stored in the memory 50 and have been subtracted from the control points m(t) to be reconstructed by the differentiator 46. The result of the adder 48 therefore is the reconstructed control points $\hat{m}(t)$, which are stored into the memory 50 to predict the control point m(t+1) of the data portion following the data portion currently encoded. As a result, the memory 50 thus contains the reconstruction of the mesh just transmitted. Due to the quantization by the scaling/quantization means 36, this mesh in the memory 50 is not identical with the original mesh, i.e. m(t)≠$\hat{m}$(t).

The aim of the encoding in the inter encoding 24 is to make the reconstructed mesh $\hat{m}$(t) as similar as possible to the original mesh m(t) with as few bits as possible. The reconstruction error is represented by the difference between the original and the decoded temporal predecessor mesh, i.e. by d(t)=m(t)−$\hat{m}$(t−1), and is used by the control means 54 to switch to the intra mode at too large a reconstruction error, as described in the foregoing.

With reference to the previous description of the functioning of the encoder 10, it is pointed out that an alternative encoder with a spatial prediction in the prediction means 42 can easily be obtained if the cluster formation means 34 and the cluster split-up means 40 are omitted from the block circuit diagram of FIG. 1 of the encoder 10, because then the prediction means has shift vectors $\hat{d}(t)$ just reconstructed immediately available at the output of the adder 32 for the prediction of subsequent shift vectors d(t) of the same mesh, i.e. particularly also those of adjacent vertices.

Figure 3:
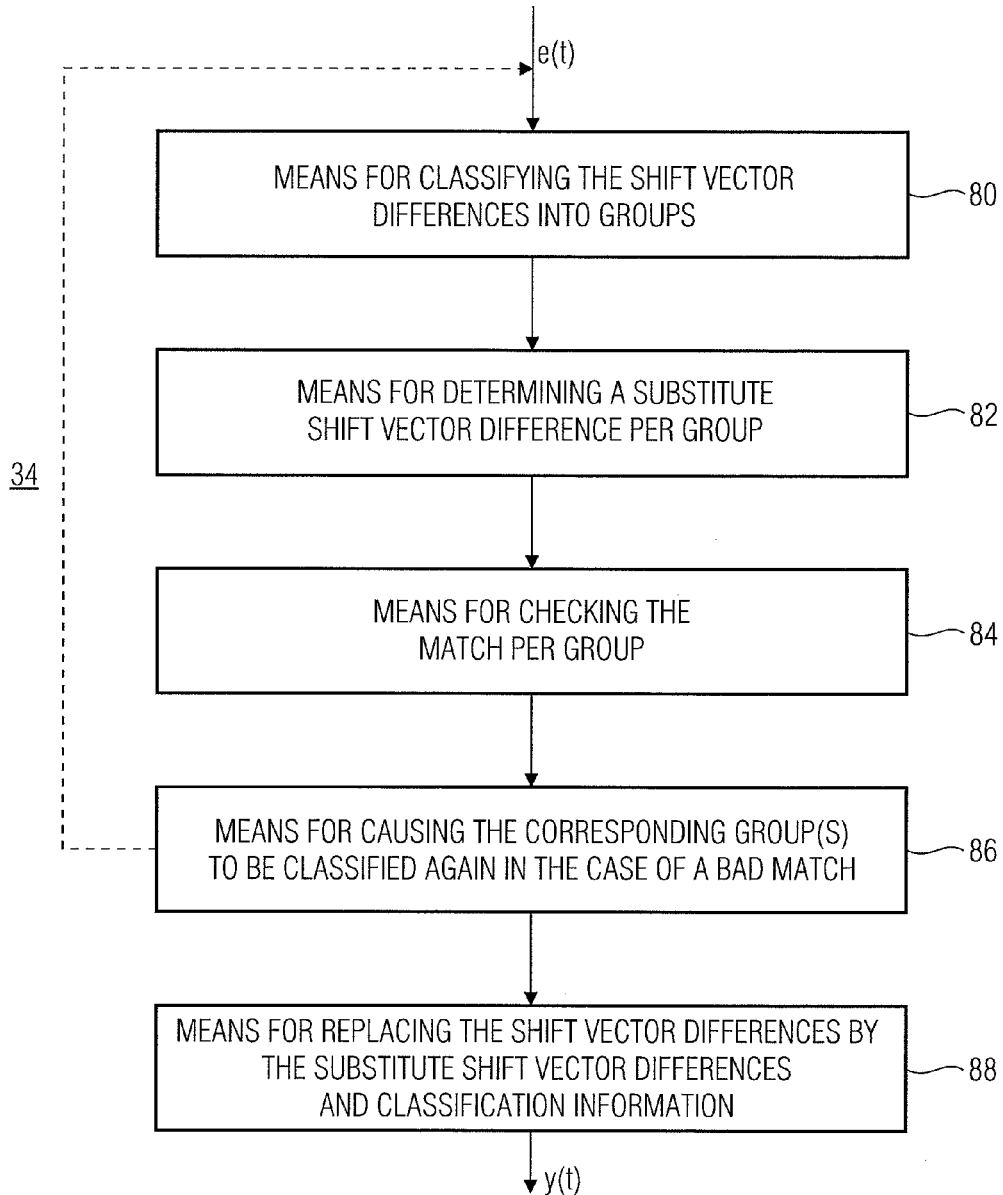
FIG. 3 is a block circuit diagram of the cluster formation means of FIG. 1.

In the following, with reference to FIG. 3, the internal construction of the cluster formation means 34 will be explained in greater detail. As can be seen, the cluster formation means 34 includes a means 80 receiving the shift vector differences e(t) and classifying same into groups, such as the groups $\{e_1(t) \ldots e_{n_1}(t)\}$, $\{e_{n_1+1}(t) \ldots e_{n_2}(t)\} \ldots \{e_{n_{g-1}+1}(t) \ldots e_N(t)\}$ with $1 \leq n_1 \leq n_2 \ldots \leq n_{g-1} \leq N$, wherein g is to represent the number of groups, and N to represent the number of vertices. The classification into groups may, for example, be done geometrically by sub-dividing a cubic cell, which surrounds all shift vector differences e(t) and is as small as possible here, for example, under certain boundary conditions, into octants, wherein all shift vector differences e(t) lying in an octant are summarized to a group.

A further means 82 of the cluster formation means 34 then determines a substitute shift vector difference per group, such as by averaging all shift vector differences belonging to the respective group. The result, therefore, is substituted shift vector differences $\bar{e}_1(t) \ldots \bar{e}_g(t)$, i.e. one per group. A further means 84 of the cluster formation means 34 then checks, for each group, the match of the substitute shift vector difference with the shift vector differences of the associated group. At too bad a match, the means 86 causes the corresponding group(s), once again, to be supplied to the means 80 and/or, once again, to be sub-divided. If too bad a match no longer results in any group, a means 88 of the cluster formation means 34 replaces the shift vector differences e(t) with the substitute shift vector differences and the classification information, which gives an indication as to which shift vector differences were summarized to groups by the recursion loop 80-86.

It is to be borne in mind that it is possible that, when using a mixed spatial/temporal prediction in the means 42, for some of the e(t), no predictors can be determined, which thus correspond to the shift vectors d as opposed to the other ones of the same mesh. In this case, it could be advantageous not to incorporate the shift vectors into the clustering of the actual shift vector differences e.

The means 40 again cancels the decimation of the number of vectors by associating the associated substitute vector difference with all vertices of the respective group, using the classification information.

The preceding description was substantially limited to the functional description of the two prediction loops 26 and 28. In the following, it will be gone into the functioning of the encoding means 56 in more detail, which performs arithmetic coding of the quantized vectors y(t), more specifically of the individual components x, y, z of these 3D vectors, which, after all, represent quantizations of the substitute shift vector differences.

In the arithmetic coding, which, in general, is a special form of the entropy coding, the characters of a source alphabet to be encoded, i.e. here the components of the vectors y(t) to be encoded, are associated with different probabilities of occurrence. For encoding a character currently to be encoded, a current probability interval is sub-divided according to the probabilities of occurrence of all characters of the source alphabet, and then the probability interval is updated by shrinking it to that sub-area of the current probability interval corresponding to the character currently to be encoded. This procedure is repeated for a series of characters to be encoded. The code word finally output for this series of characters indicates the resulting probability interval. On the decoder side, this procedure is emulated in the arithmetic decoding, i.e. an initial probability interval of, for example, 0 to 1 is sub-divided according to the probabilities of occurrence of the source alphabet in order to check into which area the code word is pointing, whereupon the probability interval is updated to this sub-area, etc. In the binary arithmetic coding used in the following, the source alphabet is fixed to two possible binary states or values, such as to 0 and 1, which is why the y(t) components are binarized before, as it will be described in the following.

In the present case, it has been realized that in the probability statistic of the shift vector differences, an arithmetic coding following CABAC (Context-Based Adaptive Binary Arithmetic Coding) leads to a high compression rate. CABAC is described, for example, in D. Marpe, H. Schwarz und T. Wiegand: "Context-Based Adaptive Binary Arithmetic Coding in the H.264/AVC Video Compression Standard" (invited paper), *IEEE Transactions on Circuits and Systems for Video Technology*, Vol. 13, No. 7, p. 620-636, July 2003. By using CABAC or a binary arithmetic coding based hereupon for the clustered reduced vectors y(t) or non-clustered motion vectors d(t), higher data compression is achieved.

Figure 4:
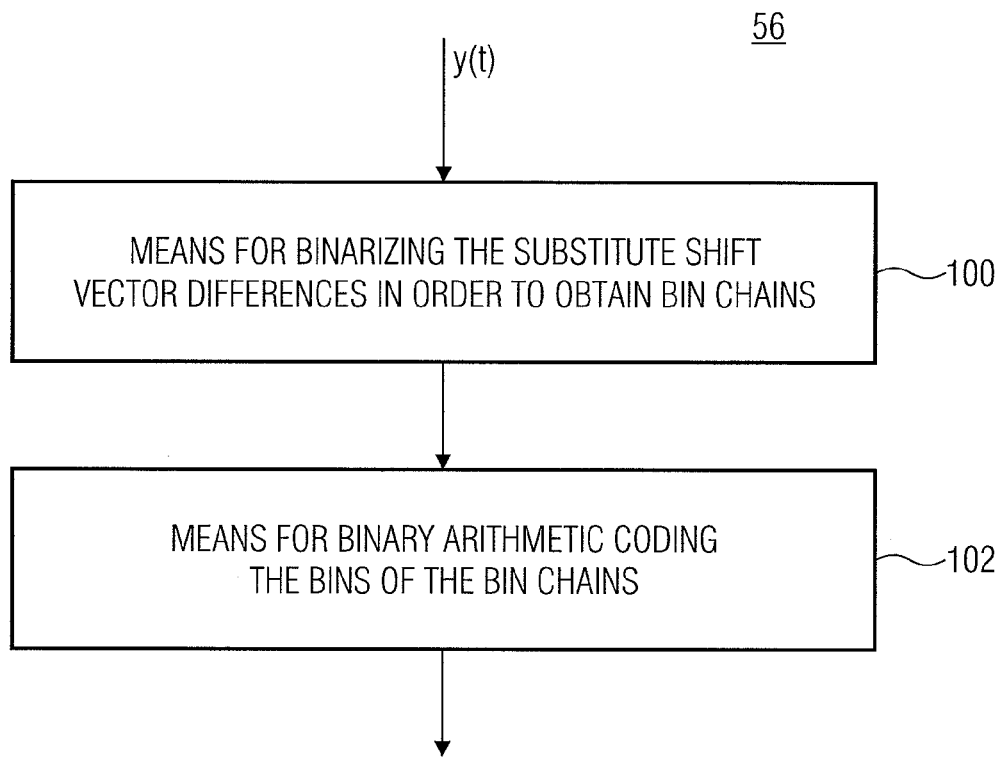
FIG. 4 is a simplified block circuit diagram of the arithmetic coder in FIG. 1.

In the following, the internal construction of the encoding means 56 will be described. FIG. 4 at first shows the rough construction of the means 56. As can be seen, the same consists of a series of a binarization means 100 and a means 102 for binary arithmetic coding. The binarization means receives the values y(t) to be encoded and binarizes the same, wherein the binarization of a value is to represent the conversion of a non-binary value into a binary representation. As will be described in the following, the binarization means according to the present embodiment exemplarily uses a combination of two binarization schemes, namely a unary binarization or, strictly speaking, a truncated unary (TU) binarization and a k-th order exp Golomb binarization. The result of the binarization by the means 100 is a series of bits representing the respective value to be encoded, such as a component x, y or z of a substitute shift vector difference y(t).

The result of the binarization of a value may also be referred to as a bin chain or a series of binary decisions or bins. This type of designation results if the binarization is regarded as being the mapping of the binarized value to a bin chain by means of a binary tree, in which the leaves of the binary tree represent the possible values of the value to be binarized, the nodes of the tree represent the binary decisions, and the individual two branches, each from a node to the subsequent level, are associated with the possible binary values 0 and 1, respectively. The value to be binarized is then mapped to that bin chain or bin series resulting on the way from the root of the binary tree to the respective leaf corresponding to the value to be binarized.

The combination of TU binarization and k-th order exp Golomb binarization used by the means 100 will be explained in greater detail with reference to FIG. 5, which illustrates the functioning of the binarization means 100. As can be seen, the binarization means 100, at first, binarizes the minimum value below a boundary value s and the value y(t) to be binarized according to a first binarization scheme, here, the unary binarization, in order to obtain a primary prefix. The unary binarization of a value x generates a code word of the length x, which begins with x−1 ones, and ends with one zero. The TU binarization used for the binarization of the prefix here, strictly speaking, represents a unary binarization using a boundary value w, which, is equal to s or 15 here. In the TU binarization of values equal to or greater than s, the terminating zero is omitted, as opposed to the pure unary binarization.

In an ensuing step 122, the binarization means 100 checks if the value y(t) to be binarized is greater than the boundary value s, wherein, if this is not the case, the binarization means 100 terminates 124 the binarization process for this value y(t) to be binarized. As a result, in this case, the binarization result only consists of the prefix. Otherwise, the means 100 binarizes the difference from the value y(t) to be binarized and the boundary value s according to a second binarization scheme in a step 126, here a k-th order exp Golomb scheme, in order to obtain a primary suffix.

The primary suffix is appended to the primary prefix in a step 128 in order to obtain the binarization result and/or the bin chain.

Figure 5:
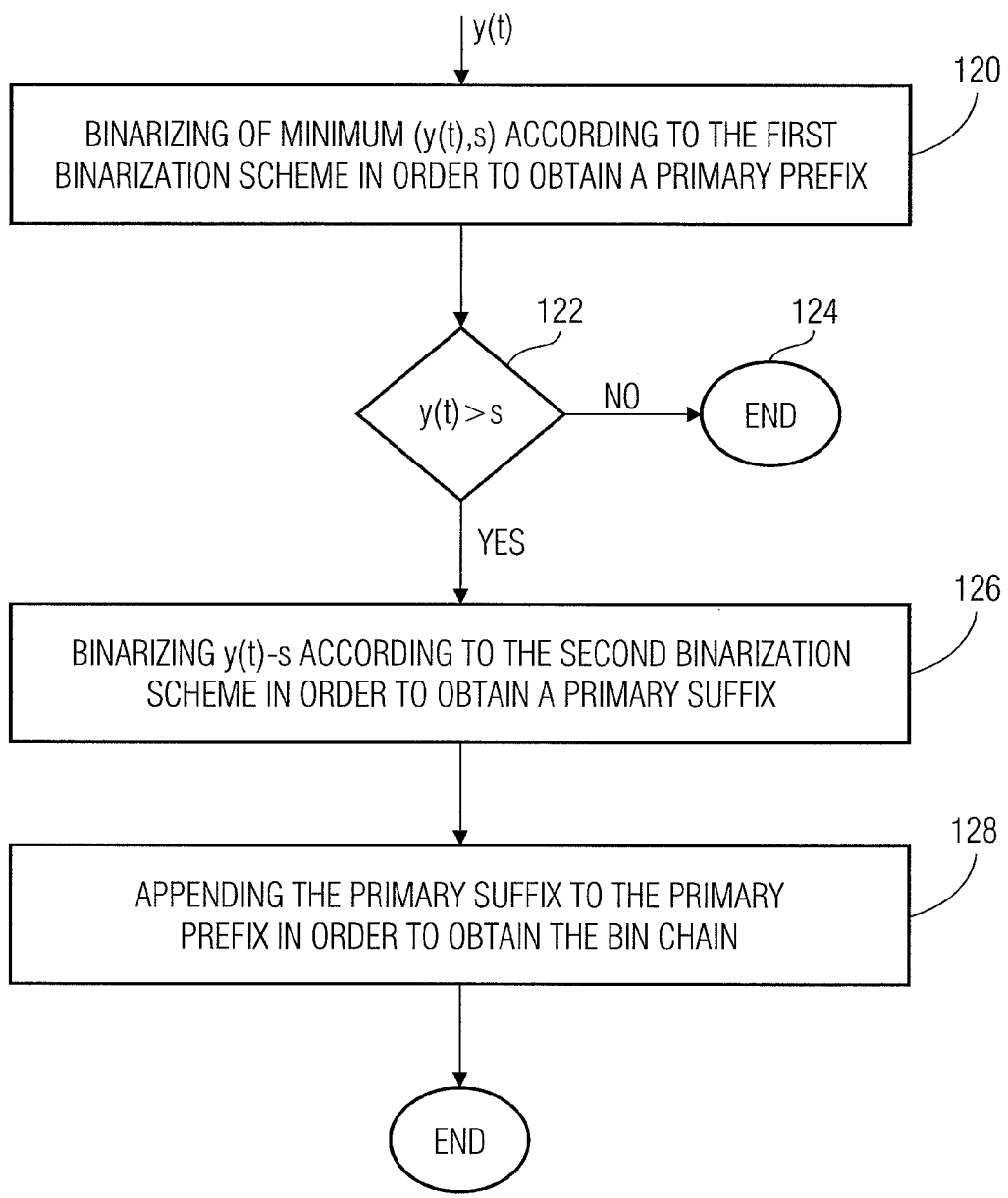
FIG. 5 is a flow chart for illustrating the functioning of the binarization means of FIG. 4.

FIG. 6 exemplarily shows the result of the binarization according to FIG. 5 for the exemplarily case of k=0 and s=14, wherein the Table in FIG. 6 shows the possible values of the value to be binarized in the left column 140, and the binarization result and/or the corresponding bit or bin series is shown to the right thereof at 142. As can be seen, the bin series 142 only consists of a prefix for values to be binarized between 1 and 14.

Values to be binarized and greater than s do not only include the TU prefix 144, but also a suffix 145, which, here, represents a 0-order exp Golomb binarization of the value b to be binarized minus s. A dashed line 146 indicates that the primary suffix 145 may itself in turn consist of a secondary prefix, namely to the left of the dashed line 146, and a secondary suffix, namely to the right of the dashed line. The last line in the Table of FIG. 6 indicates a bin number that may be relevant for the association of the individual bins with context models, as will be discussed in the following.

For the sake of completeness, the pseudo program code below shows how a value b to be binarized is mapped to a bit series, or how the bin series can be constructed depending on b, according to the k-th order exp Golomb scheme:

```
while(1) {
    if (b >= (1 << k)) {
        set (1)              //  Set the ones of the
                             //  unary secondary prefix
        b = b − (1 << k)
        k++
    } else {
        set (0)              //  Set the terminating zero of
                             //  the unary secondary prefix
        while(k−−)           //Generate the
            set ((b >> k) & 0x01)  //secondary suffix
        break                //in binary repres.
    }                        //with k digits
}
``` wherein k is the order of the exp Golomb scheme, a postpositive "++" indicates an incrementation by 1 and a postpositive "−−" a decrementation by 1, and "x<<y" is an arithmetic shift operation of a two's complement integer representation of x by y binary digits, and "x>>y" similarly is an arithmetic shift operation of a two's complement integer representation of x by y binary digits to the right, and "&" indicates a bit-wise "AND" operation working on two's complement representations. The "set" command is to indicate that a bit of the bit series be set to the value in brackets.

In other words, the secondary prefix of the primary suffix is a unary code of the value of $1(b)=\lfloor \log_2(b/2^k+1) \rfloor$, wherein the secondary suffix is a binary representation of the number of $b+2_k(1-2^{1(b)})$, using k+1(b) significant bits.

Figure 7:
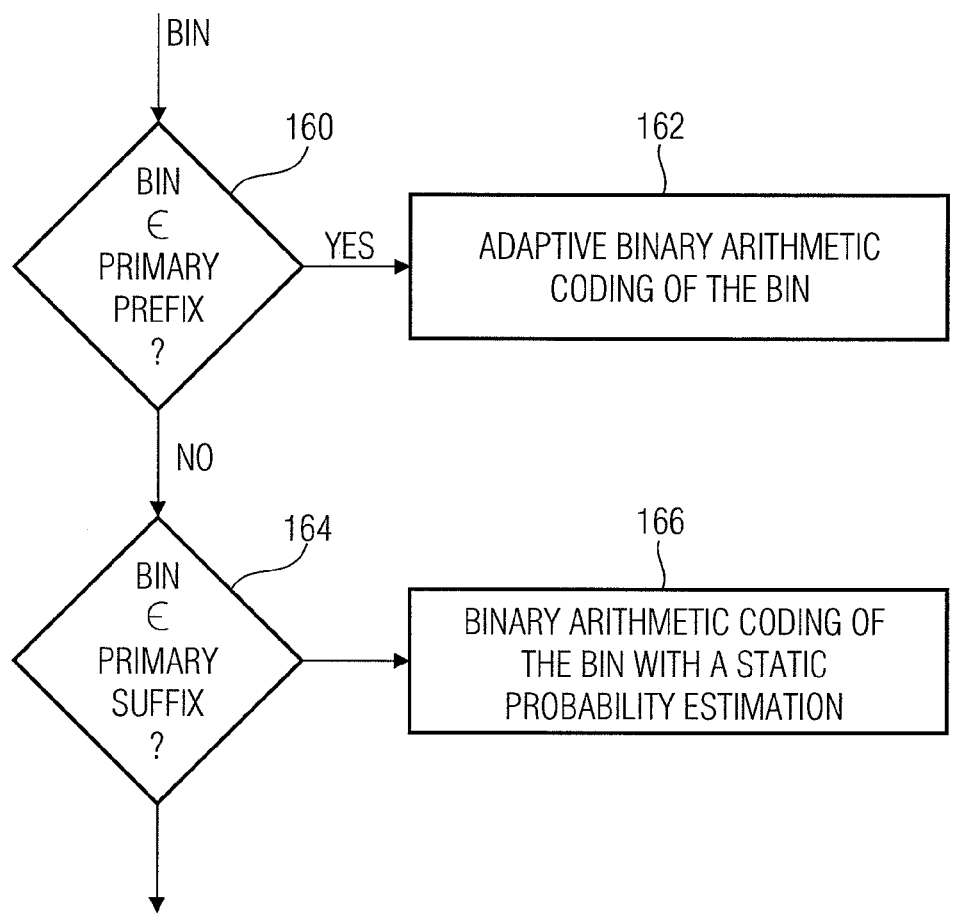
FIG. 7 is a flow chart for illustrating the functioning of the binary arithmetic coding means of FIG. 4.

On the basis of FIG. 7, the functioning of the means 102 for binary arithmetic coding of the bins of the binarization result will be described. The bins of a bin chain are then successively checked in a step 160, whether this bin is part of the primary prefix or not. If this is the case, the means 102 uses adaptive binary arithmetic coding of the bin in a step 162. This means that it uses a variable probability estimation for the bin or bit for preliminary sub-division of the current probability interval, so as to then update the probability interval to one of the two halves of the sub-divided probability interval depending on the value of the bin, wherein the probability estimation for the next bin is then updated according to the value of the current bin. Here, it is possible that also context-dependent adaptive binary arithmetic coding is performed in the step 162, as it also is the case with CABAC. In this case, the means 102 does not use the same probability estimation for all bin or bit positions of the primary prefix, but, for example, assigns various context models with which in turn, an adaptive probability estimation of its own is associated each, to the individual bin positions, for example.

If the check in the step 160 is negative, it is checked whether the bin is part of a primary suffix, in a step 162. This step could be missing if the encoder 56 is only supplied with quantized substitute shift vector differences, which may, however, not be the case due to the transmission of side information. If the check at the step 164 is positive, the means 102 uses binary arithmetic coding of the current bin with a static probability estimation in the step 166, i.e. with a probability estimation according to which the bin has the value 1 with a fixed probability p and the binary value 0 with a fixed probability 1−p. Preferably, p=0.5. Using the statistic probability estimation for the bins of the primary suffixes enables enormous reduction in effort, since no administration of adaptive probability estimates or of context models is necessary.

By the previously described combination of a method for adaptive binary arithmetic coding and the additional context-dependent modeling of the probabilities of the symbols to be encoded, the above-described arithmetic coding scheme achieves a high degree of adaptivity to the signal statistics to be encoded and represents an extremely effective method for entropy coding. Significant compression improvement is achieved. Moreover, the arithmetic coding according to the above-described manner is suited for integration in hardware and software due to its low complexity, particularly when CABAC is used for implementation, in which the interval update and the update of the probability estimations run in a table-based manner without multiplications.

In particular, the combination of TU and k-th order exp Golomb binarization described in the foregoing enables to achieve efficient representation of quantized substitute shift vector differences of arbitrary amplitude that deviate from each other relatively strongly, as they develop by the summary of similar and adjacent shift vector differences according to the above-described algorithm. The optimum length s of the unary part of the binary representation, as well as the order k of the Golomb code used are determined depending on the entirety of the values to be encoded. By using several context models for binary arithmetic coding of the binarized bin sequences, better adaptation to the signal statistics takes place.

The following is pointed out with respect to the arithmetic coding. Of course, it is possible to perform the code word generation and the adaptation again for every mesh. By the already-described summary of similar and adjacent shift vector differences to clusters, the number of values y(t) to be transmitted, however, is reduced. Here, the number may become so small that the distribution of the symbols to be encoded with reference to their aptitude for arithmetic coding by means of the above-described arithmetic coding schemes is no longer optimal, since no frequency distribution suited for this coding arises between two consecutive 3D meshes. For efficient arithmetic coding, hence, the predicted shift vectors of a sequence of consecutive 3D geometries may be summarized to a so-called group of meshes or groups of data portions, for which then a common code word is determined, i.e. with continuous interval sub-division and (context) adaptation. Thus, the shift vector differences of the entire group are commonly coded arithmetically, as opposed to a separate frame-to-frame coding or mesh-to-mesh coding of individual meshes. By the summary, more suitable symbol frequency or distribution function arises.

Figure 8:
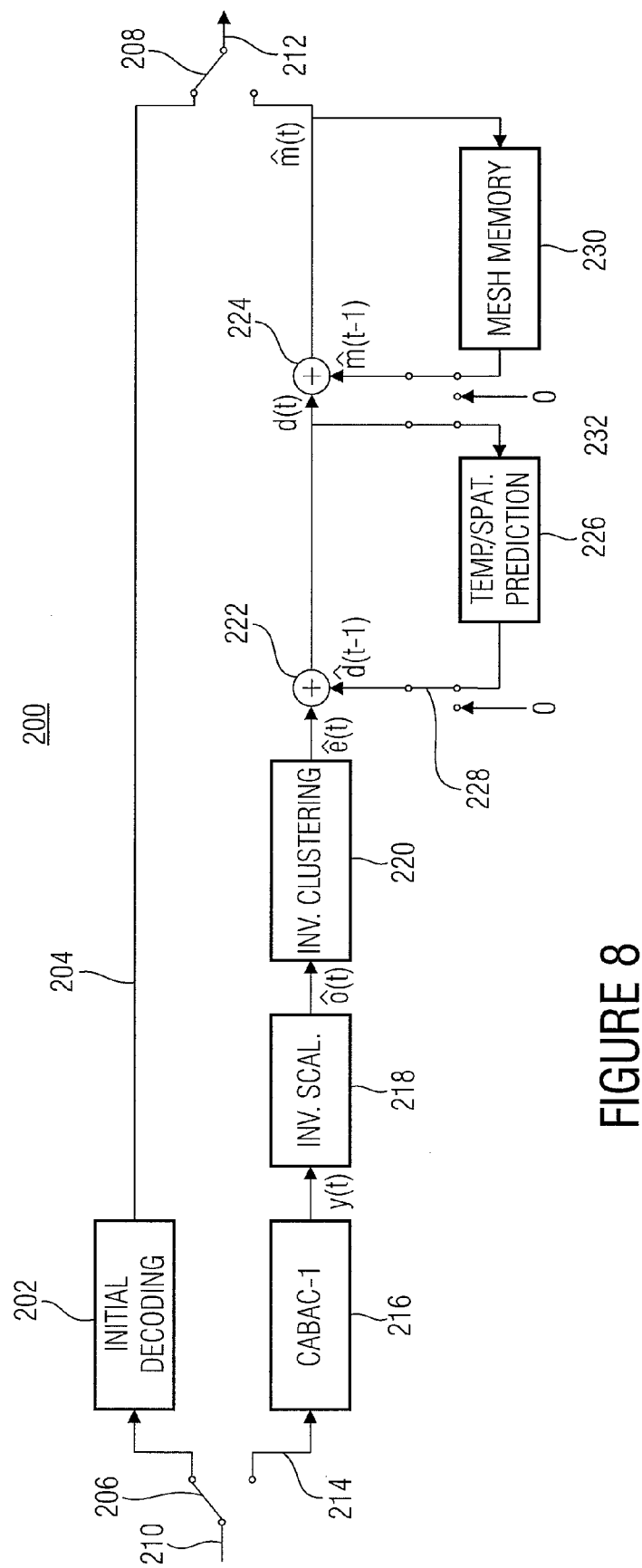
FIG. 8 is a block circuit diagram of a decoder suitable for decoding a data stream generated by the encoder of FIG. 1, according to an embodiment of the present invention.

With reference to FIG. 8, the construction of a decoder suited for decoding an encoded data stream generated by the encoder according to FIG. 1 will be described in the following for the sake of completeness. The decoder of FIG. 8 is generally indicated at 200. Its construction substantially corresponds to that part of the construction of the encoder 10 that extends from the output 14 to the mesh memory 50, with the difference that the arithmetic coding is, of course, converted to an arithmetic decoding. Correspondingly, the decoder 200 includes an initial decoder or intra decoder 202, which is connected into an intra-decoding path 204, which extends over an input-side switch 206 and an output-side switch 208 between an input 210 for the reception of the encoded data stream and an output 212 for outputting the decoded data stream or reconstructed data stream.

Apart from the intra-decoding path 204, there is an inter-decoding path 214, into which an arithmetic decoding means 216 for performing arithmetic coding inverse to the coding of the means 56, an inverse scaling means 218, a cluster split-up means 220, a combiner or adder 222, and a combiner or adder 224 in series, and which extends from the input 210 to the switch 208. The components 218-224 correspond to the components 38, 40, 32 and 48 of the encoder 10 in a functioning and an obligatory task. Correspondingly, the decoder 200 includes a time/location prediction means 226, the input of which is connected between the output of the adder 222 and an input of the adder 224 and the output of which is connected to an input of the adder 222 via a switch 228. The switch 228 corresponds to the switch 44 from FIG. 1 and switches either the output of the prediction means 226 or a logic zero to the input of the adder 222 as a substitute prediction value. The other input of the adder 222 is connected to the output of the cluster split-up means 220. Similarly, the decoder 200 includes a mesh memory 230, the input of which is connected to the output of the adder 224 and the output of which is connected to an input of the adder 224 via a switch 232 corresponding to the switch 52. The switch 232 is provided to apply either a prediction substitute value of zero or the output signal of the mesh memory 230 to the input of the adder 224. A control means not shown in FIG. 8 controls the switches 206, 208, 228 and 232 so as to adjust intra and inter mode in the decoder in a manner corresponding to the one having been described in FIG. 1, with the switches 206 and 208 always working synchronously.

The functioning of the decoder 200 results from the preceding description of FIG. 1 and will, for this reason, only be outlined briefly once again in the following. When the data stream to be decoded arrives at the input 210, at first the intra mode is present, and, thus, the intra-decoding means 202 takes over the decoding of the first data portion or mesh. The result is output at the output 212 via the switch 208 as part of the reconstructed/decoded data stream. The result of the decoding is passed to the input of the inverse scaling means 218 via a series connection, which is not shown in FIG. 8 for the sake of clarity, but corresponds to the series connection of the means 34 and 36 of the encoder of FIG. 1 during the intra mode, whereby a mesh reconstruction is obtained in the intra mode, which is entered into the mesh memory 230. Here, the switches 228 and 232 are both switched to the substitute predictor signal of zero.

The decoding of the next data portion already takes place via the inter-decoding path 214. Received, arithmetically coded, quantized substitute shift vector differences are subjected to arithmetic decoding in the decoding means 216. More specifically, the decoder 216 determines the bin series for the encoded value y(t) bin-by-bin, by the means 216 dividing a current probability interval according to the adaptive or static probability estimation to be used according to affiliation to primary prefix or primary suffix and examining whether the received code word in the encoded data stream lies in the arising upper or lower half, etc. In this way, the means 216 obtains the binarization of the value y(t) to be decoded, which it then reverses, i.e. determines the value in non-binarized representation from the binarization. The result is the values y(t), as they have been supplied to the means 56 in the encoder 10.

From then on, the procedure is as described in FIG. 1, i.e. the values y(t) are inversely scaled and split-up in order to obtain the shift vector differences in a reconstructed form, ê(t). If there is no predictor in the prediction means 226 for a shift vector difference, which means that there was also no predictor in the encoding, the particular shift vector difference $\hat{e}_i(t)$ already represents a shift vector $\hat{d}(t)$ and is, therefore, only combined with the substitute predictor 0 by the adder 222. Otherwise, the adder 222 carries out a sum between ê(t) and $\hat{d}(t-1)$. Similarly, the adder 224 carries out an addition between $\hat{d}(t)$ and $\hat{m}(t-1)$, whereupon the result is output at the output 212.

With reference to the previous description, the following will be pointed out. Although the present invention has previously been described only against the backdrop of a polygon mesh parameterization, the present invention is also applicable to other parameterizations. Spline parameterizations define a 3D graphics model, for example, by parameterizing the surface piece-by-piece or as a whole as functions in which the vertices serve as control points. One of the best-known forms is the description by splines in which the low-order polynomials are used, such as cubic B splines.

A further possible parameterization form in which the present invention is applicable consists in the slice parameterization or slice representation. It is a form of surface description finding application in computer tomography, in particular. It develops by a series of 2D sectional areas, the positions of which in the 3D space are known. The contours of these sectional areas are then connected to a 3D object by polygons or parameterization functions.

A further form of parameterization is the so-called point clouds. The surface description here arises by the expansion of the control points to simple geometric 3D bodies, such as spheres or ellipsoids. By contacting and penetrating these geometric bodies, a closed surface of the graphics model arises.

Voxel model parameterizations form a special kind of 3D description without connectivity. Here, cubes or cuboids are used as geometric bodies, which are equally large or differ in size depending on the embodiment, wherein the location of the geometric bodies is determined by the control points.

Skeleton model parameterizations use control points as support locations of a number of one-dimensional parameterization functions describing the skeleton of a 3D model. The surface of the model then develops by the radial expansion by the skeleton functions, e.g. as cylinders, ellipsoids, or blobs.

Finally, there is still one form of parameterization in which geometric primitives are used. 3D graphics or objects may be represented here as simple, so-called geometric primitives or a union of several primitives. Primitives may be spheres, cones, pyramids, truncated cones, truncated pyramids, cylinders, prisms, rectangular blocks, ellipsoids, or parallelepipeds, the location and positions of which are indicated by control points.

As previously mentioned, depending on the parameterization used, the way in which the spatial neighbors of the vertex currently to be encoded are determined in the spatial prediction may change.

In the previously-described outer loop, which determined the motion or shift vectors of temporally successive meshes, and the inner loop, which was used for difference formation between temporally or spatially adjacent shift vectors, scaling took place in the means 36. This scaling may also be missing, so that the block 38 and/or 218 could be missing. Further generalizations will certainly be apparent to skilled persons upon studying the present invention, which is why the above description of particular embodiments is not to be understood as limiting.

The above embodiments thus illustrate methods and arrangements for encoding and decoding temporally varying 3D computer graphics models, wherein the encoding and decoding includes motion compensation, quantization and arithmetic coding, as well as a corresponding computer program and a corresponding computer-readable medium on which the computer program is stored in executable manner.

In particular, the above embodiments describe a complete system for INTRA-INTER coding of 3D meshes, wherein static and dynamic models (with and without topology change) can be processed alike. It is possible to switch over to the INTRA mode after a fixed or variable number of encoded meshes. The prediction of the shift vectors may take place between the vertices of a 3D mesh in a consecutive time instants. Use, adaptation and optimization of CABAC for arithmetic coding of shift vectors and shift vector differences of 3D meshes, separately for each time instant or collectively for a number of consecutive time instants in a group of meshes, enables a further increased compression rate. The component-wise prediction of one or more shift vectors of one or more vertices may take place with a median predictor or a common group predictor at the encoder and with or without side information at the decoder. Formation and optional transmission of corresponding side information for a median predictor with the aid of shift vectors of vertices encoded spatially and temporarily before may be provided. Likewise, formation and transmission of a common predictor for a group of shift vectors or vertices to be encoded is possible. A quantization of the component-wise shift vector differences among the original shift vector of the vertices to be encoded and the corresponding predicted shift vector each allows for small values, which are compressible more easily. Entropy decoding of the quantized or un-quantized shift vector differences between the original shift vector of the vertices to be encoded and the corresponding predicted shift vector each provides for further compression. Decoding of the encoded vertices by addition of the median predictor calculated at the decoder or group predictor and the decoded shift vector differences takes place on the decoder side. Entropy encoding with a context-adaptive arithmetic encoder may be provided in addition, as described above, just like the corresponding entropy decoding. Context calculation at the coder and decoder with the aid of shift vectors of vertices encoded spatially and temporarily before and the positions of these vertices both is possible, as described above.

Finally, it is pointed out that, depending on the conditions, the inventive coding scheme may also be implemented in software. The implementation may be on a digital storage medium, particularly a floppy disc or a CD with electronically readable control signals, which are capable of interacting with a programmable computer system, so that the corresponding method is executed. In general, the invention also consists in a computer program product with program codes stored on a machine-readable carrier for performing the method according to the invention, when the computer program product is executed on a computer. In other words, the invention may thus be realized as a computer program with a program code for performing the method, when the computer program is executed on a computer.

In particular, the above method steps in the blocks of the flowcharts or the means blocks may be implemented individually or several of them in sub-program routines. Alternatively, implementation of these blocks is also possible as individual parts of an ASIC, of course.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for decoding an encoded data stream, which is an encoded form of a data stream representing a temporally varying graphics model, the data stream comprising a series of data portions with coordinate data defining the graphics model at different time instants, and the encoded data stream including prediction error vector differences, the apparatus comprising:
   a processor for processing the encoded data stream in order to obtain decoded prediction error vector differences;
   a first predictor for predicting prediction error vectors for a first data portion currently to be decoded, based on already-decoded prediction error vector differences, in order to obtain predicted prediction error vectors for the first data portion;
   a first combiner for combining the predicted prediction error vectors with prediction error vector differences of the first data portion currently to be decoded, in order to obtain prediction error vectors for the first data portion;
   a second predictor for predicting coordinate data of the first data portion based on already-obtained coordinate data of a second data portion preceding the first data portion, in order to obtain predicted coordinate data for the first data portion; and
   a second combiner for combining the predicted coordinate data for the first data portion with the prediction error vectors for the first data portion, in order to obtain the coordinate data of the first data portion.

2. The apparatus according to claim 1, wherein the first predictor is formed to predict the prediction error vectors for the first data portion based on those prediction error vector differences for the second data portion, and the second combiner is formed to perform the combination with those prediction error vector differences for the second data portion that are assigned to the prediction error vector differences for the first data portion by a unique association between the prediction error vector differences of the first data portion and the prediction error vector differences of the second data portion.

3. The apparatus according to claim 1, wherein the second predictor is formed to perform the prediction of a part of the prediction error vectors for the first data portion currently to be decoded, based on already-obtained prediction error vectors for the first data portion.

4. The apparatus according to claim 1, wherein the second predictor is formed, for the prediction of a predetermined prediction error vector for the first data portion, to
   at first check neighborhood information in the data stream as to whether such a prediction error vector difference of the prediction error vector differences of the first data portion, and a predicted prediction error vector therefrom, has already been obtained, which comprises a neighborhood relation to a prediction error vector difference, from which the predetermined prediction error vector is to be obtained by a combination,
   if such a prediction error vector difference exists, use the prediction error vector obtained therefrom for the prediction of the predetermined prediction error vector.

5. The apparatus according to claim 1, wherein the first predictor is formed to perform, in case more than one predictor is present for a predetermined prediction error vector among the prediction error vectors for the first data portion, the prediction of the predetermined prediction error vector based on the median of these predictors.

6. The apparatus according to claim 1, wherein the coder comprises:
   an enlarger for enlarging the number of prediction error vector differences by
   (a) assigning the prediction error vector differences as substitute prediction error vector differences to groups, depending on classification information in the encoded data stream; and
   (b) replacing each prediction error vector difference with groups of identical prediction error vector differences so as to use these as the prediction error vector differences.

7. The apparatus according to claim 1, wherein a predetermined prediction error vector difference is encoded into the encoded data stream by encoding bits of a codeword representing a binarization thereof bit-by-bit into the encoded data stream, wherein the codeword comprises a primary prefix, which represents a binarization of a minimum of the predetermined prediction error vector difference according to a first binarization scheme, and, if the predetermined prediction error vector difference is greater than the predetermined boundary value, a primary suffix, which represents a binarization of a difference of the predetermined prediction error vector difference minus the predetermined boundary value according to a second binarization scheme, with the first and second binarization schemes being different, and the processor for processing the encoded data stream comprising:
   a binary arithmetic decoder for, for each bit of the codeword,
      if the bit of the codeword is part of the primary prefix, binarily arithmetically decoding the bit by means of an adaptively varying bit value probability estimation, and
      if the bit of the codeword is part of the primary suffix, binarily arithmetically decoding the bit by means of a static bit value probability estimation,
   in order to obtain the codeword;
   an extractor for extracting the minimum from the primary prefix;
   a means for extracting the difference from the primary suffix and for adding the difference to the predetermined boundary value if the minimum is smaller than the predetermined boundary value, in order to obtain the predetermined prediction error vector difference, and otherwise for regarding the minimum to be the prediction error vector difference.

8. A method for decoding an encoded data stream, which is an encoded form of a data stream representing a temporally varying graphics model, the data stream comprising a series of data portions with coordinate data defining the graphics model at different time instants, and the encoded data stream including prediction error vector differences, the method comprising:
   processing the encoded data stream in order to obtain decoded prediction error vector differences;

predicting prediction error vectors for a first data portion currently to be decoded, based on already-decoded prediction error vector differences, in order to obtain predicted prediction error vectors for the first data portion;

combining the predicted prediction error vectors with prediction error vector differences of the first data portion currently to be decoded, in order to obtain prediction error vectors for the first data portion;

predicting coordinate data of the first data portion based on already-obtained coordinate data of a second data portion preceding the first data portion, in order to obtain predicted coordinate data for the first data portion; and combining the predicted coordinate data for the first data portion with the prediction error vectors for the first data portion, in order to obtain the coordinate data of the first data portion.

9. A non-transitory computer-readable medium having stored thereon a computer program with a program code for performing, when the computer program is executed on a computer, a method for decoding an encoded data stream, which is an encoded form of a data stream representing a temporally varying graphics model, the data stream comprising a series of data portions with coordinate data defining the graphics model at different time instants, and the encoded data stream including prediction error vector differences, the method comprising:

processing the encoded data stream in order to obtain decoded prediction error vector differences;

predicting prediction error vectors for a first data portion currently to be decoded, based on already-decoded prediction error vector differences, in order to obtain predicted prediction error vectors for the first data portion;

combining the predicted prediction error vectors with prediction error vector differences of the first data portion currently to be decoded, in order to obtain prediction error vectors for the first data portion;

predicting coordinate data of the first data portion based on already-obtained coordinate data of a second data portion preceding the first data portion, in order to obtain predicted coordinate data for the first data portion; and combining the predicted coordinate data for the first data portion with the prediction error vectors for the first data portion, in order to obtain the coordinate data of the first data portion.

* * * * *